United States Patent [19]
Fisher

[11] 3,964,783
[45] June 22, 1976

[54] OPENING ROOF ASSEMBLIES FOR VEHICLES

[75] Inventor: John Albert Fisher, Sutton Coldfield, England

[73] Assignee: Weathershields Limited, Birmingham, England

[22] Filed: Dec. 16, 1974

[21] Appl. No.: 533,304

[30] Foreign Application Priority Data
Dec. 22, 1973 United Kingdom............... 59685/73
Jan. 25, 1974 United Kingdom................. 3462/74

[52] U.S. Cl.............................. 296/137 C; 49/504; 296/137 E
[51] Int. Cl.².......................................... B60J 7/10
[58] Field of Search......... 296/137 C, 137 B, 137 E, 296/137 H, 137 R; 52/495, 475, 656; 49/504; 29/428

[56] References Cited
UNITED STATES PATENTS

| | | | |
|---|---|---|---|
| 2,025,874 | 12/1935 | Lange | 296/137 C |
| 2,103,372 | 12/1937 | Lange | 296/137 C |
| 3,403,476 | 10/1968 | Ciucani | 49/504 |
| 3,555,736 | 1/1971 | Koch, Jr. et al. | 49/504 |
| 3,820,840 | 6/1974 | Forsberg | 296/137 B X |

*Primary Examiner*—Albert J. Makay
*Assistant Examiner*—Donald W. Underwood
*Attorney, Agent, or Firm*—Scrivener Parker Scrivener and Clarke

[57] ABSTRACT

In an opening roof assembly for a vehicle a flexible fabric covering is supported by a number of slidably mounted cross-members which are guided at their ends in guide rails, and the guide rails form the side members of a unitary frame adapted to be received in an opening in a roof of a vehicle and secured to the roof.

4 Claims, 7 Drawing Figures

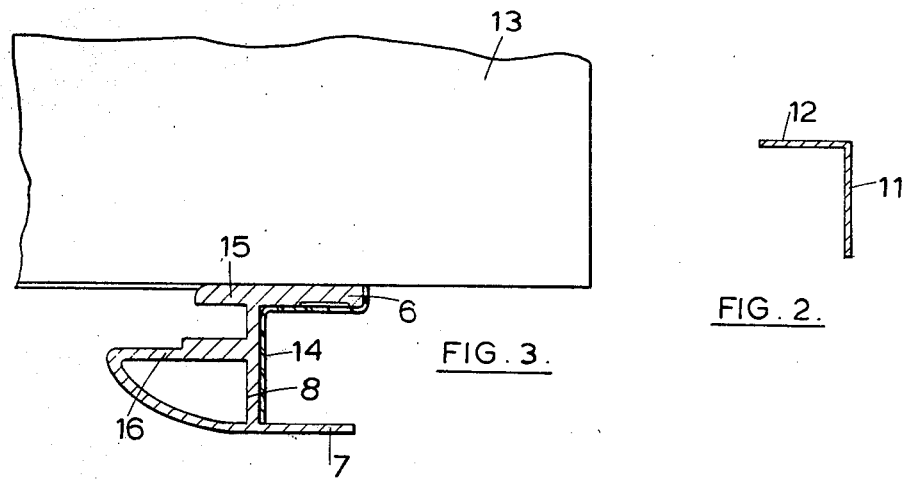
FIG. 2.
FIG. 3.
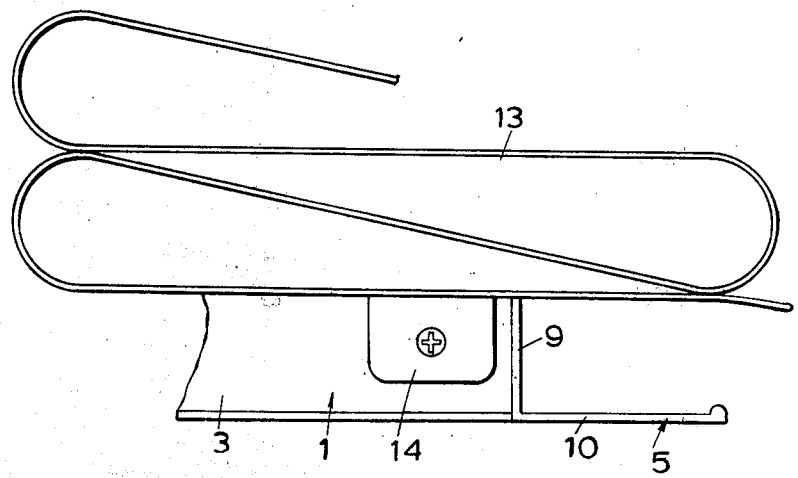
FIG. 4.

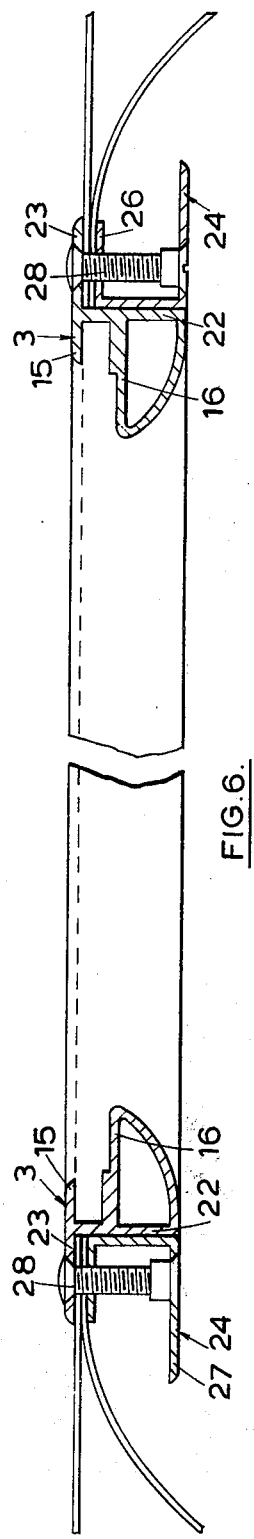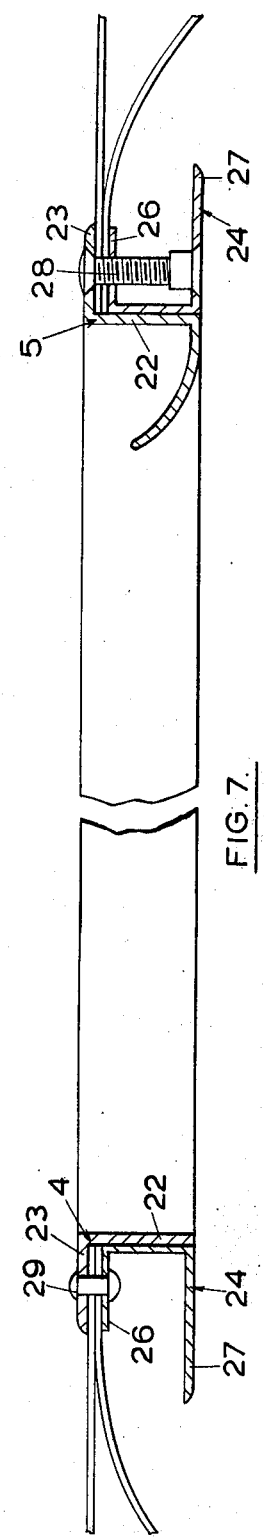

OPENING ROOF ASSEMBLIES FOR VEHICLES

This invention relates to opening roof assemblies for vehicles such as saloon cars of the kind in which a flexible fabric covering is supported by a number of slidably mounted cross-members which are guided at their ends in guide rails extending along each side of a longitudinal opening in a roof, one end of the covering being fixed to the roof at the rear end of the opening, and the flexible covering being movable manually between a closed position in which the opening is covered and an open position in which substantially the complete opening is exposed.

In known roof assemblies of the kind set forth the guide rails and rails at the front and rear ends of the opening are assembled and attached separately and individually to the roof at a corresponding edge of the opening. Thereafter the cross-members and the fabric covering are assembled in a frame defined by the rails with the rear end of the fabric covering being attached to the rail of the rear edge of the opening. This is a complicated and time consuming procedure, requiring the performance of a number of separate operations.

According to my invention, in an opening roof assembly of the kind set forth the guide rails and a pair of spaced front and rear end rails interconnecting adjacent ends of the guide rails define a unitary frame, and the guide and end rails are so constructed and arranged that the frame can be received in the opening and secured to the roof.

This simplifies and expedites the installation of a roof assembly in a vehicle.

Conveniently the rear end of the fabric covering may also be attached to the rear end rail.

Preferably the guide rails comprise upper and lower spaced flanges which are directed outwardly from a vertical web with the upper flanges extending outwardly by greater distances than the lower flanges, the distance between the free edges of the lower flanges of the guide rails being slightly greater than the spacing between corresponding side edges of the opening. Thus, by tilting and slewing the frame with respect to the opening, it can be received therein with the upper flanges overlying the roof portions on opposite sides of the opening with the free edges of the lower flanges engaging with and slightly deflecting or deforming the head lining of the vehicle.

Conveniently the rear end member to which the fabric covering may be secured is of the same section as the guide rails.

In another construction the guide rails and the front and rear end rails which define the unitary frame each comprises a vertical web and a flange directed outwardly from the upper end of the web so that, when the lower ends of the webs are inserted into the opening from the outer side of the roof, the flanges overlie the portions of the roof which define the opening which roof portions are adapted to be clamped between the flanges and complementary clamping strips which are disposed on the inside of the roof on the outer side of the webs.

Four separate clamping strips may be provided but preferably such clamping strips are interconnected to define a second unitary frame which receives the outer faces of the webs and is clamped into position by suitable fastening means, connecting the second frame to the flanges and passed through convenient openings in the portions of the roof which the flanges overlie and in superimposed portions of the head lining.

Thus the installation of the outer frame is facilitated as it is simply inserted into position without having otherwise to tilt or slew it with respect to the opening.

Two embodiments of my invention are illustrated in the accompanying drawings in which:

FIG. 2 is a section on the line 2—2 of FIG. 1;

FIG. 3 is a section on the line 3—3 of FIG. 1;

FIG. 4 is a scrap view of a portion of the side of the frame in the rear region containing the fabric covering;

FIG. 6 is a transverse section through the roof assembly of FIG. 5 with the frame installed in the roof assemby; and FIG. 7 is a longitudinal section through the roof assembly of FIG. 5 with the frame installed in the roof opening.

Figure 1:
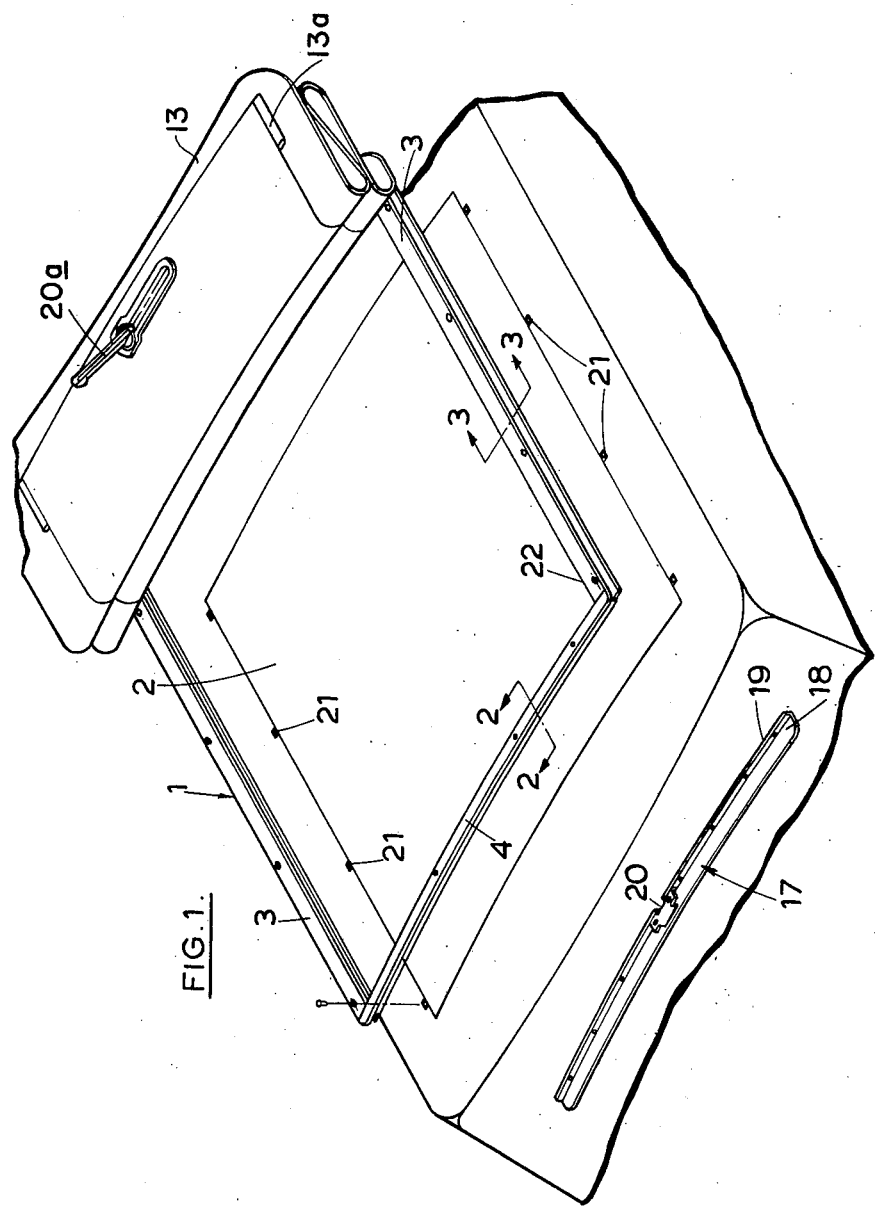
FIG. 1 is a perspective view of an opening roof assembly showing a unitary frame superimposed above an opening in the roof of a vehicle.

The opening roof assembly illustrated in FIGS. 1 to 4 of the drawings comprises a unitary frame 1 of generally oblong rectangular outline which is adapted to be installed in an opening 2 in the roof of a vehicle. The frame 1 comprises spaced parallel guide rails 3 and spaced front and rear end rails 4, 5 which are welded at opposite ends to the opposite ends of the guide rails 3 and all comprise extruded sections. Each guide rail 3 comprises upper and lower spaced flanges 6 and 7 which are directed outwardly from a vertical web 8, with the upper flanges extending outwardly by greater distances than the lower flanges 7. The rear end rail 5 is of a section complementary to that of the side rails but with an upper outwardly directed flange at the upper end of a vertical web 9 being wider than a flange 10 at the lower end of the web 9. The front end rail is of angle section having a vertical flange 11 and an outwardly directed flange 12 at its upper end.

The relative dimensions of the frame 1 and the opening 2 are chosen such that the dimension between the outer face of the web 9 and the forward face of the flange 11 is slightly less than the main longitudinal dimension of the opening 2, and the distance between the outer faces of the webs 8 is less than the transverse dimension of the opening 2. Furthermore, the distance between the face edges of the lower flanges 7 of the guide rails 3 is only slightly greater than the spacing between the corresponding side edges of the opening 2.

A fabric covering 13 of dimensions slightly greater than those of the internal dimensions of the frame 1 is secured to the rear of the frame 1 conveniently by brackets 14 which carry the covering 13 and which are secured to the webs 8 of the guide rails 3. The fabric covering is attached to the frame before any attempt is made to install the frame 1 in the opening 2, and the covering is provided with a plurality of cross-members of which one is shown at 13a for engagement with the guide rails 3 after the frame 1 has been installed in the opening 2.

To install the frame 1 in the opening 2 the rear end rail 5 is first inserted into the opening so that its upper and lower flanges straddle the roof at the rear of the opening and, by tilting and slewing the frame 1 with respect to the roof, the frame 1 is received within the opening 2 with the upper flanges 6 of the guide rails and the rear end rail 5 overlying the roof portions on opposite sides of the opening and at the rear of the opening.

The depth of the webs 8 is carefully selected to enable the frame 1 to be tilted by an angular distance so that the effective distance between the outer faces of the webs 8 is less than the width of the opening.

when the frame 1 is in the installed position the upper flanges 6 are spaced from the side edges of the opening by equal distances, as are the lower flanges 7 of which the free edges engage with and slightly deflect or deform the head lining of the vehicle.

The installation is completed by engaging opposite ends of the cross-members 13a supporting the fabric covering 13 in the guide rails 3 between upper and lower flanges 15, 16 which are directed inwardly from the webs 8 and of which each lower flange 16 is preferably curved back on itself at its outer end and is continuous with the outwardly directed lower flange 7 engaging with the head lining.

A transverse member 17 of angle section is secured to the downwardly directed flange 11 of the front end rail 4 with a flange 18 extending forwardly away from that end of the opening and lying in a common plane with the lower flanges 7 and 10 of the guide rails 3 and the rear end rail 5 respectively. The vertical flanges 19 and 11 of the transverse member 17 and the front end rail 4 respectively are provided with superimposed openings 20 in which are received, and with which co-operate, handle-operated locking means 20a for moving the flexible covering 13 between open and closed positions, and for locking it in the closed position in which the covering covers the opening 2 and is substantially taut.

The portion of the roof on opposite sides of the opening 2 are provided with spaced fixing points 21, for example threaded or plain openings or threaded nuts, in which screws or bolts are screwed through complementary superimposed openings in the upper flanges 6 to maintain the frame in position.

Figure 5:
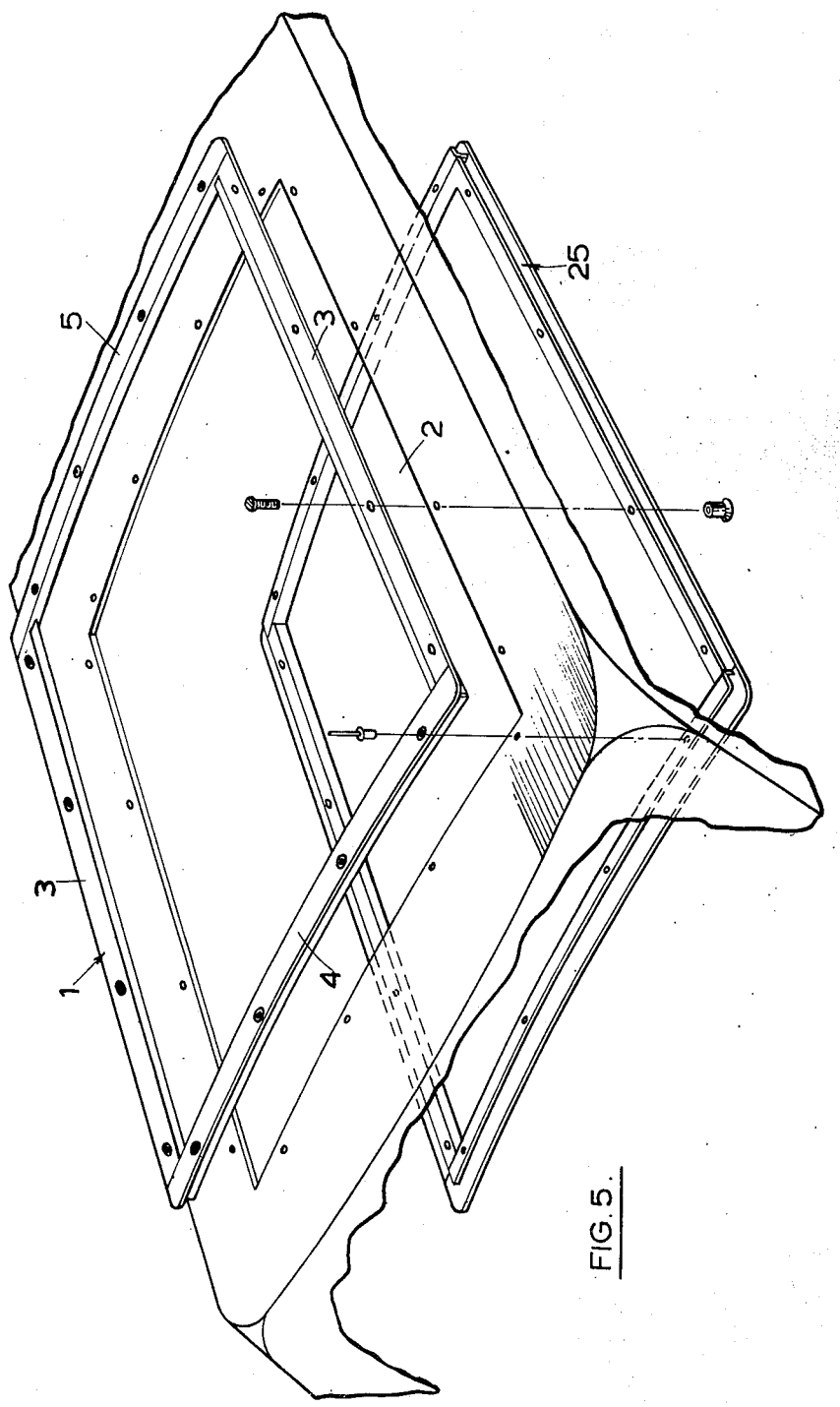
FIG. 5 is a perspective view similar to FIG. 1 of a second opening roof assembly incorporating a modified unitary frame.

In the embodiment of FIGS. 5 to 7, the guide rails 3, and the front and rear end rails 4, 5 of the unitary frame 1 each comprises a vertical web 22 and a flange 23 directed outwardly from the upper end of the web 22 so that the webs 22 can be simply inserted into the opening 2.

The frame 1 is secured in position by four clamping strips 24 which may be separate from each other but preferably are welded together or otherwise interconnected to form a second unitary inner frame 25 which receives the outer faces of the webs 22.

As illustrated each clamping strip 24 is of U-shaped channel section with an upper flange 26 clamped against the flange 23 of the outer frame 1 and a lower flange 27 of a great width than the upper flange 26 to engage the head lining at its outer edge. In this construction the clamping strips corresponding to the guide rails and the rear end rail are secured in position by nuts and bolts 28 passed through holes in the flanges of the outer frame 1 and in the upper and lower flanges of the clamping strips. The front end clamping strip 24 is secured to the front end rail 4 by rivets 29 connecting the upper flange to the flange of the rail.

In another construction the clamping strips 24 may be of oblong rectangular cross-section secured in position by screws. Preferably, the screws are screwed from the outer faces of the flanges of the outer frame 1 into tapped holes in the clamping strips.

In a further construction the clamping strips are of generally U-shaped channel section with the flanges vertical and so that the inner flange is engagable with the outer face of the web of a rail. The web of each clamping strip is extended outwardly beyond the outer flange of the strip so that its free end can engage with the head lining. The side and rear end clamping strips are secured in position by nuts and bolts passed through aligned holes in the flanges of the outer frame and the webs of the clamping strips.

The front end clamping strip may be connected to the front end rails by means of rivets connecting the inner flange to the web of the rails.

The constructuon and installation of the roof assembly as illustrated in FIGS. 5 to 7 is otherwise the same as that of FIGS. 1 to 4 and need not be described further herein, corresponding reference numerals having been applied to corresponding parts.

Our invention lends itself particularly to the installation of opening roof assemblies in vehicles on a production-line basis. Thus the frame can be fitted simply and quickly in pre-produced openings in the roofs of vehicles during the construction of the vehicles themselves.

I claim:

1. An opening roof assembly for vehicles comprising a flexible fabric covering, a number of slidably mounted cross-members supporting said covering, a unitary frame comprising spaced guide rails in which said slidably mounted cross-members are guided at their ends, and spaced front and rear end rails interconnecting opposite ends of said guide rails, said guide rails and said front and end rails being so constructed and arranged that said frame can be received in an opening in a roof with said guide rails extending along each side thereof, said fabric covering being movable manually between a closed position in which said opening is covered and an open position in which substantially the complete opening is exposed, wherein said guide rails comprise upper and lower spaced flanges which are directed outwardly from a vertical web with said upper flanges extending outwardly by greater distances than said lower flanges, the distances between free edges of said lower flanges being slightly greater than the spacing between corresponding side edges of said opening whereby, by tilting and slewing said frame with respect to the opening, said frame can be received therein with said upper flanges overlying roof portions on opposite sides of said opening.

2. An opening roof assembly as claimed in claim 1, wherein the depth of said webs is chosen to enable said frame to be tilted by a sufficient angular distance for the effective distance in the plane of the roof of the vehicle between the outer faces of said webs of the guide rails to be less than the width of said opening.

3. An opening roof assembly as claimed in claim 1, wherein said front end rail is of angle section having a downwardly directed flange for engagement with a roof portion defining the front end of said opening, and a forwardly directed flange lying in a common plane with said upper flanges of said guide rails and secured to the roof portion at that end of said opening.

4. An opening roof as claimed in claim 3, including a transverse member of angle section adapted to be secured to said downwardly extending flange of said front end rail with a flange extending forwardly away from that end of said opening and lying in a common plane with said lower flanges of said guide rails.

\* \* \* \* \*